US011096188B1

(12) United States Patent
Vasisht et al.

(10) Patent No.: US 11,096,188 B1
(45) Date of Patent: Aug. 17, 2021

(54) SCHEDULING SATELLITE DATA TRANSMISSIONS USING DIFFERING SETS OF GROUND STATIONS

(71) Applicant: Microsoft Technology Licensing, LLC, Redmond, WA (US)

(72) Inventors: Deepak Vasisht, Redmond, WA (US); Ranveer Chandra, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/087,534

(22) Filed: Nov. 2, 2020

(51) Int. Cl.
*H04W 72/12* (2009.01)
*H04B 17/40* (2015.01)
*H04B 7/155* (2006.01)
*H04B 7/195* (2006.01)

(52) U.S. Cl.
CPC ............ *H04W 72/12* (2013.01); *H04B 7/155* (2013.01); *H04B 7/195* (2013.01); *H04B 17/40* (2015.01)

(58) Field of Classification Search
CPC .............................. H04W 84/06; H04W 72/12
See application file for complete search history.

(56) References Cited

U.S. PATENT DOCUMENTS

2018/0083741 A1* 3/2018 Motoyoshi ......... H04B 7/18513

OTHER PUBLICATIONS

"Attenuation Due to Clouds and Fog", In Technical Report of International Telecommunications Union, Aug. 2019, 06 Pages.

"AWS Ground Station", Retrieved from: https://aws.amazon.com/ground-station/, Retrieved Date: Sep. 24, 2020, 07 Pages.

"Dark Sky API", Retrieved from: https://darksky.net/dev, Retrieved Date: Sep. 25, 2020, 01 Page.

"Digital Video Broadcasting (DVB); Second generation framing structure, channel coding and modulation systems for Broadcasting, Interactive Services, News Gathering and other broadband satellite applications (DVB-S2)", In Technical Report of European Standard (Telecommunications series), 2009, 78 Pages.

"Ground Station Services", Retrieved from: https://www.ksat.no/services/ground-station-services/, Retrieved Date: Sep. 25, 2020, 10 Pages.

"Leaf Line", Retrieved from: https://leaf.space/leaf-line/, Retrieved Date: Sep. 25, 2020, 12 Pages.

(Continued)

*Primary Examiner* — Keith Ferguson

(57) ABSTRACT

The disclosure herein describes transmitting data from a satellite using a primary ground station and a set of secondary ground stations. An orbit of the satellite is determined over a schedule period and a subset of secondary ground stations is identified based on the determined orbit of the satellite, wherein secondary ground stations are configured to receive from the satellite and not transmit to the satellite. A transmission schedule associated with the satellite is then generated. For each secondary ground station of the subset, a time interval during which the satellite is within communication range is determined, an expected transmission rate is estimated, and the time interval and the expected transmission rate are included in the transmission schedule. The transmission schedule is provided to the satellite via the primary ground station, whereby the satellite is configured to transmit data to the subset of ground stations based on the transmission schedule.

20 Claims, 7 Drawing Sheets

(56) References Cited

OTHER PUBLICATIONS

"Planet Labs Inc. Earth Station Application. FCC Request. Attachment A", Retrieved from: http://licensing.fcc.gov/myibfs/download.do?attachment_key=1073553, Jan. 2015, 04 Pages.

"Rain Height Model for Prediction Methods", In Technical Report of International Telecommunications Union, Sep. 2013, 03 Pages.

"SatNOGS: An Open Source Ground Station and Network", Retrieved from: https://web.archive.org/web/20140510111032/https://satnogs.org/, May 10, 2014, 05 Pages.

"Sentinel 2: Core Ground Segment Design", Retrieved from: https://sentinel.esa.int/web/sentinel/missions/sentinel-2/ground-segment/core-ground-segment, Retrieved Date: Sep. 25, 2020, 01 Page.

"Sentinel 6: Ground Segment Design", Retrieved from: https://sentinel.esa.int/web/sentinel/missions/sentinel-6/ground-segment, Retrieved Date: Sep. 25, 2020, 01 Page.

"Specific Attenuation Model for Rain for Use in Prediction Methods", In Technical Report of International Telecommunications Union, Mar. 4, 2019, 08 Pages.

"UCS Satellite Database", Retrieved from: https://www.ucsusa.org/resources/satellite-database, Apr. 1, 2020, 03 Pages.

Barbulescu, et al., "Satellite Range Scheduling: A Comparison of Genetic, Heuristic and Local Search", In Proceedings of International Conference on Parallel Problem Solving from Nature, Sep. 7, 2002, 10 Pages.

Colton, et al., "Supporting the Flock: Building a Ground Station Network for Autonomy and Reliability", In Proceedings of 30th Annual AIAA/USU Conference on Small Satellites, 2016, 07 Pages.

Cutler, et al., "Applying the Lessons of Internet Services to Space Systems", In Proceedings of IEEE Aerospace Conference, Mar. 9, 2002, pp. 3287-3295.

Cutler, James, "Ground Station Virtualization", In Proceedings of The Fifth International Symposium on Reducing the Cost of Spacecraft Ground Systems and Operations, Jul. 8, 2003, 09 Pages.

Denby, et al., "Orbital Edge Computing: Nanosatellite Constellations as a New Class of Computer System", In Proceedings of the Twenty-Fifth International Conference on Architectural Support for Programming Languages and Operating Systems, Mar. 9, 2020, pp. 939-954.

Devaraj, et al., "Dove High Speed Downlink System", In Proceedings of 31st Annual AIAA/USU Conference on Small Satellites, 2017, 09 Pages.

Devaraj, et al., "Planet High Speed Radio: Crossing Gbps from a 3U Cubesat", In Proceedings of the 33rd AIAA/USU Conference on Small Satellites, Aug. 2019, 10 Pages.

Escher, Anna, "Inside Planet Labs' New Satellite Manufacturing Site", Retrieved from: https://techcrunch.com/2018/09/14/inside-planet-labs-new-satellite-manufacturing-site/, Sep. 15, 2018, 05 Pages.

Etherington, Darrell, "SpaceX Launches 58 More Starlink Satellites and 3 Planet Skysats for First Rideshare Launch", Retrieved from: https://techcrunch.com/2020/06/13/spacex-launches-58-more-starlink-satellites-and-3-planet-skysats-for-first-rideshare-launch/, Jun. 13, 2020, 04 Pages.

Gale, et al., "College Admissions and the Stability of Marriage.", In Proceedings of The American Mathematical Monthly., Jan. 1, 1962, pp. 9-15.

Henry, Caleb, "Amazon Moving Project Kuiper Team to New RD Headquarters", Retrieved from: https://spacenews.com/amazon-moving-project-kuiper-team-to-new-rd-headquarters/, Dec. 18, 2019, 03 Pages.

Hoots, et al., "Models for Propagation of NORAD Element Sets", In Technical Report of Aerospace Defense Command, United States Airforce, Dec. 1980, 105 Pages.

Klofas, Bryan, "Planet Labs Ground Station Network", In Proceedings of 13th Annual CubeSat Developers Workshop, Apr. 21, 2016, 17 Pages.

Morello, et al., "DVB-S2: The Second Generation Standard for Satellite Broad-Band Services", Proceedings of the IEEE, vol. 94, Issue 1, Jan. 3, 2006, pp. 210-227.

Preindl, et al., "GENSO: The Global Educational Network for Satellite Operations", In Proceedings of 59th International Astronautical Congress, Sep. 29, 2008, 01 Page.

Schmidt, Marco, "Ground Station Networks for Efficient Operation of Distributed Small Satellite Systems", In Thesis Submitted to Institute of Computer Science, University of Wurzburg, 2011, 11 Pages.

Shrestha, et al., "Characterization of Rain Specific Attenuation and Frequency Scaling Method for Satellite Communication in South Korea", In International Journal of Antennas and Propagation, vol. 2017, Jan. 3, 2017, 16 Pages.

Zufferey, et al., "Graph Colouring Approaches for a Satellite Range Scheduling Problem", In Journal of Scheduling, vol. 11, Issue 4, Aug. 2008, pp. 263-277.

Nakamura, et al., "Ground Station Network to Improve Operation Efficiency of Small Satellites and Its Operation Scheduling Method", In Proceedings of 57th International Astronautical Congress, Oct. 2, 2006, pp. 1-11.

Schmidt, et al., "Design and Implementation of In Orbit Experiments for the Pico Satellite UWE-1", In Proceedings of 57th International Astronautical Congress, Oct. 2, 2006, pp. 1-8.

* cited by examiner

SCHEDULING SATELLITE DATA TRANSMISSIONS USING DIFFERING SETS OF GROUND STATIONS

BACKGROUND

In recent years, the use of Low Earth Orbit (LEO) satellites has increased dramatically. Many companies have committed to deploy constellations of hundreds of CubeSats (small-sized satellites) in low Earth orbits. Around 75% of satellites in orbit around the earth are LEO satellites. These LEO satellites generally serve two purposes: communication and Earth observation. Earth observation satellites provide high-resolution images of Earth in various ranges of the electro-magnetic spectrum (e.g., visible light, infrared, radio waves, etc.) at high revisit rates. Such satellites typically take high-resolution images of the Earth and transmit them down to ground stations. Observation satellites collect hundreds of Gigabytes worth of observation data in a single pass over the Earth and coordinating the transmission of all the collected data to ground stations presents a significant challenge. Such transmissions are limited by data rate limitations associated with the wireless transmission techniques used, and by the limited amount of time that a satellite may be in communication range of a ground station. For example, due to the low orbit, some satellites move fast with respect to a ground station on Earth and can only communicate with the ground station for less than ten minutes in a single pass. Multiple ground stations may be used but this requires the placement of many ground stations around the Earth, each of which may be complex and expensive.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for transmitting data from a satellite using a primary ground station and a set of secondary ground stations is described. An orbit of the satellite is determined over a schedule period based on trajectory data of the satellite and a subset of secondary ground stations is identified from the set of secondary ground stations based on the determined orbit of the satellite, wherein secondary ground stations are configured to receive from the satellite and not transmit to the satellite, and wherein the identified subset of secondary ground stations are within communication range of the determined orbit of the satellite. A transmission schedule associated with the satellite is then generated. The generation of the transmission schedule includes, for each secondary ground station of the subset of secondary ground stations, determining a time interval during which the satellite is within communication range of the secondary ground station, estimating an expected rate of data transmission from the satellite to the secondary ground station during the determined time interval, and including the time interval and the expected rate of data transmission in the transmission schedule in association with the secondary ground station. The generated transmission schedule is then provided to the satellite via the primary ground station, wherein the primary ground station is configured to receive from the satellite and transmit to the satellite, whereby the satellite is configured to transmit data to the subset of secondary ground stations based on the generated transmission schedule.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
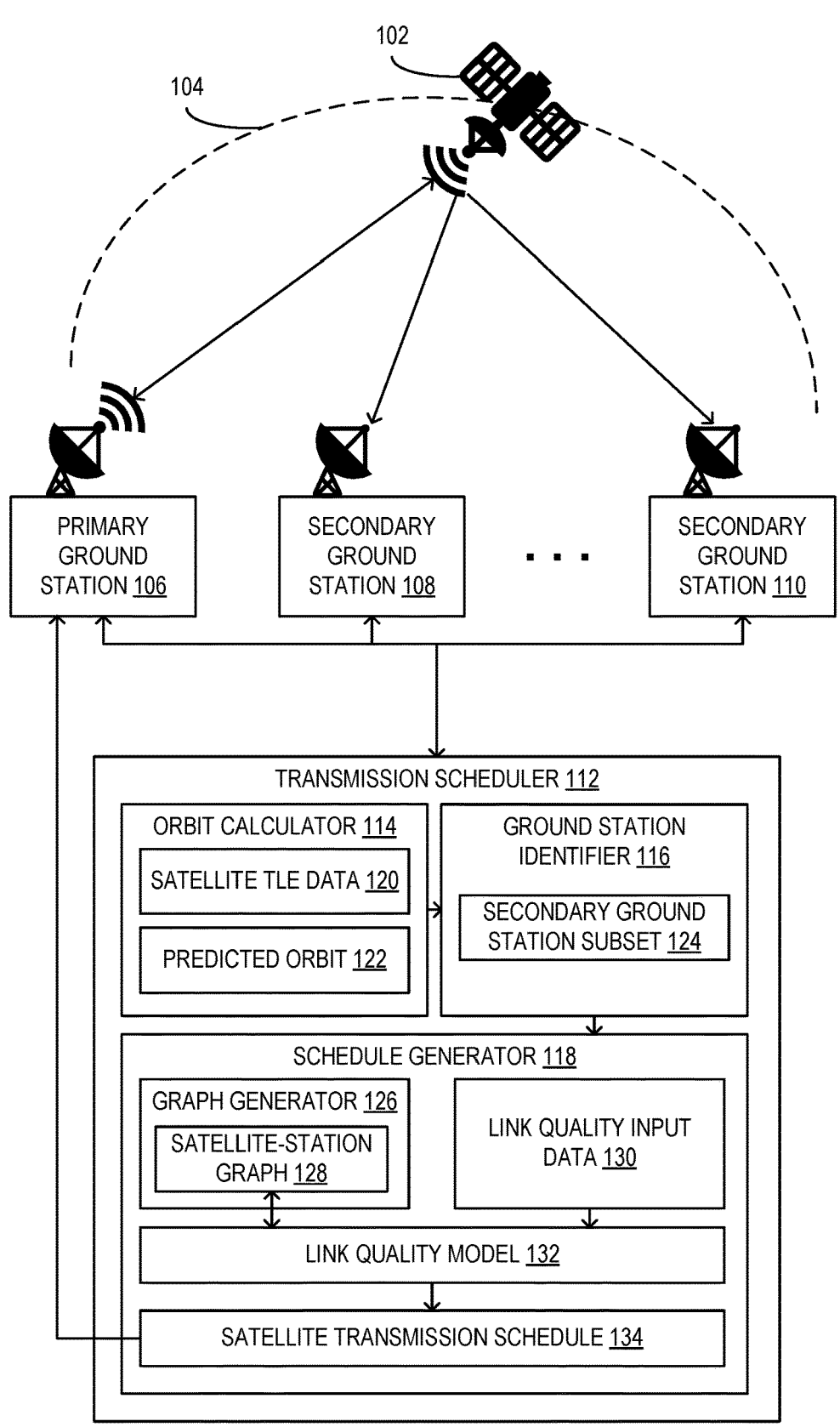
FIG. 1 is a block diagram illustrating a system configured for providing a transmission schedule to a satellite via a primary ground station, thereby configuring the satellite to transmit data to secondary ground stations according to an embodiment.

Aspects of the disclosure provide a computerized method and system for scheduling transmissions from satellites to ground stations. The ground stations are grouped into different sets of ground stations, such as primary ground stations and secondary ground stations, in some examples. The primary ground stations may have different characteristics than the secondary ground stations. For example, the primary ground stations may have both transmit and receive capability, whereas the secondary ground stations may have just receive capability. In other examples, the set of ground stations have other differing characteristics, such as communication power levels, communication data rate, communication range, error recovery schemes, and more. While aspects of the disclosure are described with reference to primary and secondary ground stations, those skilled in the art will note that the disclosure is operable with any two sets of ground stations. For example, all the ground stations in both sets may be the same, but one set (e.g., configured for receiving only) has more ground stations than the other set (e.g., configured for transmitting and receiving).

The method and system described herein may include determining an orbit of a satellite over a schedule period based on trajectory data of the satellite and identifying a subset of secondary ground stations from a set of secondary ground stations based on the determined orbit of the satellite. The identified subset of secondary ground stations are within communication range of the determined orbit of the satellite. A transmission schedule associated with the satellite is generated for the satellite, including, for each secondary ground station of the subset of secondary ground stations, determining a time interval during which the satellite is within communication range of the secondary ground station, estimating an expected rate of data transmission from the satellite to the secondary ground station during the determined time interval, and including the time interval and the expected rate of data transmission in the transmission schedule. The generated transmission schedule is then provided to the satellite via the primary ground station, which is configured to transmit the generated transmission schedule to the satellite. In this manner, the satellite is configured to transmit data to the subset of secondary ground stations based on the generated transmission schedule.

The disclosure addresses the challenges of efficiently obtaining data from satellites despite the existing limitations associated with transmitting data from satellite to ground station as described herein. Satellite-to-ground station communication is limited by the relatively short time periods during which a satellite is within range of a ground station and by the data transmission rate limitations associated with the wireless transmission of the satellite. While multiple ground stations may be used to coordinate consistent transmissions from the satellite, establishment of many conventional ground stations may be expensive (e.g., the cost of licensing and setting up a ground station is prohibitive for new entrants, like academic research satellites, in the low earth orbit (LEO) satellite space) and complex (e.g., conventional ground stations may require more expensive, higher quality communication dishes and/or other equipment than secondary ground stations as described herein). Further, such a network of conventional ground stations may be under-utilized if the constellation of satellites that uses the network is small (e.g., the ground stations may not be used efficiently due to times when no satellite is in range for transmitting) and/or it may introduce significant latency into the data collection process when a satellite is only able to transmit data when in range of sparsely-located ground stations (e.g., this latency is crucial for time-sensitive applications of satellite data like flood modeling and forest fires). The disclosure describes the use of a network of primary ground stations, which are configured to both receive from and transmit to satellites, and secondary ground stations, which are configured to receive from satellites but may not be capable of transmitting to satellites. The inclusion of the secondary ground stations addresses the issues of expense and complexity, as establishing ground stations that are only capable of receiving transmission from satellites is substantially less expensive and/or requires less complex equipment (e.g., less complex computing resources such as hardware components) than establishing a primary ground station that is capable of both transmitting and receiving. The disclosure further operates in an unconventional manner by generating transmission schedules for satellites that configure the satellites to transmit data to secondary ground stations according to the schedule without requiring any sort of acknowledgement from the secondary ground stations. The generated transmission schedules may be provided to a satellite occasionally using a primary ground station when the satellite is in communication range. Further, the described geographically distributed design has many advantages. The disclosure can automatically scale to varying demands. Allowing the ground stations to be distributed also allows the disclosure to avoid requiring high throughput on individual transmission links. High throughput can be achieved by leveraging the geographical diversity using links to multiple secondary ground stations as opposed to a single link. Moreover, the described system is more robust to weather variations. Satellite transmissions can be dynamically scheduled so that low-rate transmissions in cloudy weather in one part of the world are offset by high-rate transmissions in clear weather in the other. Finally, because a satellite is likely to encounter many more ground stations, it can offload latency-sensitive data faster.

The described scheduler accounts for orbits of satellites, estimated transmission link quality, and weather conditions, among other factors. Further, it allows for different object functions that optimize the transmission of data from one or more satellites based on throughput, mean latency, peak latency, and other parameters. Additionally, the disclosure accounts for the lack of acknowledgement from the secondary ground stations to the satellite regarding successful transmission of data by enabling the secondary ground stations to provide acknowledgements to the system via network connection such that the primary ground stations may notify the satellite and any missing content can be obtained from the satellite when it re-enters communication range with the primary and secondary ground stations of the network.

FIG. 1 is a block diagram illustrating a system 100 configured for providing a transmission schedule 134 to a satellite 102 via a primary ground station 106, thereby configuring the satellite 102 to transmit data to secondary ground stations 108-110 according to an embodiment. In some examples, the system 100 includes at least one satellite 102 in an orbit 104 around a body in space (e.g., the Earth, the Moon, Mars, etc.) that is configured to communicate with ground stations (e.g., ground stations 106, 108, and 110) located on the surface of that body. The system 100 further includes a transmission scheduler 112, which includes hardware, firmware, and/or software configured to generate satellite transmission schedules 134 as described herein. The satellite 102 is configured to transmit data to, receive data from, and/or otherwise communicate with the ground stations 106, 108, and 110 using any wireless communication protocols and/or in one or more frequency bands or ranges without departing from the description. Further, the primary ground station 106 is configured to transmit data to, receive data from, and/or otherwise communicate with the satellite 102 in a similar manner. In some examples, the secondary ground stations 108-110 are configured to only receive data from the satellite 102 via wireless communication and are configured such that they lack the capability to transmit data to the satellite 102 via wireless communication (or are configured to be restricted from such transmissions). Alternatively, the secondary ground stations 108-110 may be configured to be less powerful, less flexible, or otherwise be limited in capabilities compared to the primary ground station 106 while still being capable of wirelessly communicating with the satellite 102 in some instances. In other examples, the secondary ground stations 108-110 and the primary ground station 106 may be configured to have similar wireless communication capabilities and may be considered to be "primary" or "secondary" based on the operations that they are configured to perform (e.g., a first ground station may be a primary ground station based on being configured to perform the operations of a primary ground station as described herein while a second ground station may be a secondary ground station based on being configured to perform the operations of a secondary ground station as described herein). Further, while the description primarily describes examples with a single primary ground station, in other examples, the system 100 may include multiple primary ground stations at various locations on the surface.

In some examples, the primary ground station 106, the secondary ground stations 108-110, and the transmission scheduler 112 are configured to connect to a network or networks (e.g., an intranet, the Internet, or other network) and communicate with each other over associated network connections. For instance, the transmission scheduler 112 is configured to provide the satellite transmission schedule 134 to the primary ground station 106 via a network connection as described herein. It should be understood that the network connections between the ground stations 106, 108, and 110 and the transmission scheduler 112 may include wired connections or wireless connections and may use any network protocols without departing from the description herein. Further, in some examples, the transmission scheduler 112 may be located on and/or otherwise performed by a computing device or devices associated with one or more of the ground stations 106, 108, and/or 110. For instance, the transmission scheduler 112 may be located on and executed by a computing device of the primary ground station 106. Alternatively, or additionally, the transmission scheduler 112 may be located on and/or executed by a computing device or devices that are separate from the ground stations 106, 108, and/or 110 without departing from the description. For instance, some portion or all of the transmission scheduler 112 may be located on and/or executed on a distributed network of multiple computing devices using cloud computing techniques, such that some or all operations of the transmission scheduler 112 are performed "in the cloud" (e.g., on one or more computing devices of the distributed network). In such cases, communications between the primary and secondary ground stations may be routed through the distributed network via the transmission scheduler 112 (e.g., acknowledgements from secondary ground stations may be routed to the primary ground station via the transmission scheduler 112).

In some examples, the satellite 102 is a LEO satellite that is configured to capture or collect data by observing the Earth with cameras and/or other sensors. For instance, the satellite 102 may be configured to capture high-resolution images of the surface of the Earth using one or more cameras. The satellite 102 is further configured to send the captured data to the ground stations 106, 108, and/or 110 via wireless communication as described herein. The satellite 102 is traveling around the Earth in an orbit 104, such that the satellite 102 can only communicate with a particular ground station when it is has "line of sight" (LOS) of the ground station (e.g., the Earth or other objects are not blocking a straight-line path between the satellite 102 and the ground station) and when it is within communication range of the ground station (e.g., the distance between the satellite 102 and the ground station is small enough that the satellite 102 is capable of communicating data wirelessly to the ground station with a defined degree of reliability). For instance, the satellite 102 may be in LOS of the secondary ground station 108 but if it is still far enough away that any wireless communication degrades substantially, the satellite 102 may not be considered to be in communication range of the secondary ground station 108.

A communication range threshold between a satellite and ground station may be defined specifically based on the transmission capabilities of the satellite 102 (e.g., hardware configuration, settings, and/or limitations may determine the power of the signal that can be transmitted and/or the frequency range in which the signal can be transmitted) and the reception capabilities of the target ground station (e.g., hardware configuration, settings, and/or limitations may determine what signal strength and/or frequency ranges the ground station is capable of receiving). Similarly, back-and-forth wireless communications between the satellite 102 and a primary ground station 106 as described herein are also based on the satellite 102 having LOS of the primary ground station 106 and being within communication range of the primary ground station 106, which may also be based on the attributes of the satellite 102 and/or the primary ground station 106.

In some examples, the ground stations include one or more primary ground stations 106 that are configured to transmit to as well as receive from one or more satellites 102, and a set of secondary ground stations 108-110 that are configured to only receive from the one or more satellites 102, or at least to only rarely transmit to the one or more satellites 102. The ground stations may be arranged as a distributed architecture of ground station networks (DGS) that is spread around the surface of the Earth (or other body). The ground stations of the DGS may be maintained by independent individuals, volunteers, or corporations, and their distribution around the globe provides advantages, such as enabling the satellites 102 to follow dynamic schedules for transmission to the distributed ground stations, thereby reducing the latency of the process of transmitting collected data from the satellites 102 to the ground stations based on those dynamic transmission schedules. In the DGS, because many of the ground stations are secondary ground stations 108-110 and secondary ground stations are configured to only receive data from satellites 102, secondary ground stations 108-110 may be configured to be less complex and less expensive than primary ground station 106, which must also be capable of transmitting to the satellite 102. Further, because of the lower complexity and expense requirements for secondary ground stations, it becomes more likely that people will have access to the technology required and be willing to participate as part of a DGS as described herein.

To account for the communication range-based limitations of the satellite 102 with respect to transmitting the collected data to the ground stations 106, 108, and/or 110, in some examples, the transmission scheduler 112 includes hardware, firmware, and/or software configured to provide a satellite transmission schedule 134 that is custom-generated for the satellite 102 based on its specific orbit 104 to configure the satellite 102 to transmit the collected data to a variety of the secondary ground stations 108-110 in an effective and efficient manner, as described herein. The transmission scheduler 112 includes an orbit calculator 114, a ground station identifier 116, and a schedule generator 118.

The orbit calculator 114 is configured to use current satellite data, such as satellite Two Line Element (TLE) data 120 or other satellite location and trajectory data, to calculate or otherwise predict a predicted orbit 122 that describes the satellite 102's predicted path with respect to the ground stations on the surface. For instance, the predicted orbit 122 may include data indicating a path along the surface of the Earth across which it is most likely to travel over the course of the next defined time period and/or the next full orbit made by the satellite 102. Using satellite TLE data 120, a predicted orbit 122 that is accurate to within a kilometer can be calculated if performed up to a few days in advance. In some examples, even greater accuracy may be possible by calculating the predicted orbit 122 more often and/or only predicting up to a shorter time, such as 12 hours or 24 hours, in advance.

The ground station identifier 116 is configured to use the predicted orbit 122 of the satellite 102, and/or predicted orbits of other satellites, to identify a subset of secondary ground stations 124 that may be used by the satellite 102 as transmission targets during the satellite's traversal of the surface over the course of the time period associated with the predicted orbit 122. The ground station identifier 116 is further configured to access ground station location information, such as latitude and longitude, as well as other ground station information, such as ownership information and data downlink constraints, of the secondary ground stations 108-110. In some examples, data downlink constraints enable ground station owners to maintain some control over their resources (e.g., a ground station owner may want satellite operators to pay a subscription fee) and/or to maintain regulatory restrictions (e.g., some countries may not allow downlink data from satellites operated by their competitors). Such data downlink constraints of a single ground station may be represented as an M-bit bitmap where M is a set of satellites, and where bit i is 1 if data downlink transmission from a satellite $s_i$ is allowed and 0 if data downlink transmission from the satellite $s_i$ is not allowed. The ground station location information and/or other ground station information may be compared to the predicted orbit 122 and other data of the satellite 102 to populate the subset of secondary ground stations 124.

In some examples, the subset of secondary ground stations 124 may change dynamically with respect to instances in the time period of the predicted orbit 122 (e.g., every 30 seconds, every 10 seconds, every 5 seconds, etc.) such that, for each instance of the time period, the subset 124 includes secondary ground stations for which the satellite 102 will have LOS, or be above the horizon for the ground stations, and be in communication range during that instance. The subset 124 may further include time information associated with each of the secondary ground stations therein that indicates, for each ground station, the portion of the time period of the predicted orbit 122 during which the ground station can receive data transmissions from the satellite 102 (e.g., the ground station is in LOS and in communication range of the satellite 102).

The schedule generator 118 uses the secondary ground station subset 124 and associated time information to generate a satellite-station graph 128, use the graph 128 and a link quality model 132 to determine estimated transmission link quality between the satellite 102 and the ground stations of the subset 124, and generate a satellite transmission schedule 134 therefrom. The graph generator 126 is configured to generate the satellite-station graph 128 based on the secondary ground station subset 124 and, in some cases, further based on priority data associated with the data for transmission from the satellite 102. For instance, in some examples, satellite 102 includes a sequence of data bits X that are to be transmitted to ground stations. For the sequence of data bits, a value function Φ is defined such that for any subset $x \in X_i$ and time t elapsed since the capture of the data, as Φ(x, t) denotes the inherent value, or value factor, of transmitting that data to Earth. This value function may be configured for different objectives. For instance, if the system aims to minimize the time between data capture and data transfer, Φ(x, t)=t may be used such that the value of each subset of data increases as time increases. Alternatively, or additionally, if minimizing throughput is the goal, Φ(x, =|x| (where |x| denotes the number of bits in x) can be used as the value function. Similarly, Φ(x, t) can be defined by satellite operators to prioritize data based on geography or on other attributes of the data (e.g., a satellite operator may configure the satellite to prioritize data captured for a particular geographic region to honor service level agreements (SLAs) with customers). Different satellites may be configured to prioritize data for transmission in different ways without departing from the description herein.

In some examples, the graph generator 126 generates the satellite-station graph 128 based on the parameters described above. The graph 128 may be a weighted graph with the ground stations G and the satellites S as nodes. An edge is included in the graph 128 between a ground station and a satellite if the satellite has LOS to the ground station or if the satellite is above the horizon for the ground station, if the satellite and ground station are within communication range, and if a communication link between the satellite and ground station adhere to any constraints defined by the ground station. In some examples, the graph is dynamically updated throughout the time period associated with the predicted orbit 122 based on changes to the secondary ground station subset 124 and/or other parameter changes during that period. In the graph 128, the weights of the edges may be determined by estimating the value of using the associated transmission link between the satellite and the ground station to transmit data from the satellite. In such examples, link quality is estimated using a link quality model such as link quality model 132 as described below.

The link quality model 132 is configured to estimate the quality of transmission links between the satellite 102 and ground stations based on link quality input data 130 and/or attributes or parameters of the satellite-station graph 128. Such estimated link quality values may be used to apply weights to the edges of the graph 128, which enables the optimization of the selection of transmission links for a satellite 102 to use during its traversal along the predicted orbit 122. In some examples, the estimation of link quality and/or capacity is based on three factors of the link quality input data 130: (a) the distance between the satellite and the ground station, (b) the weather conditions—rain and clouds can significantly attenuate the signal, and (c) the hardware used by the ground station and the satellite.

"Loss" of a transmission signal from the satellite 102 when it traverses distance through space can be given by the following equation:

$$L = \left(\frac{4\pi df}{c}\right)^2$$

In the above equation, L is the loss to the transmission signal, d is the distance, f is the frequency, and c is the speed of light. The distance and frequency values may be provided in the link quality input data 130 to the link quality model 132 and the loss L calculated therefrom. In addition to this loss, Earth's atmosphere also causes attenuation of the signal. The degree of this atmosphere-based attenuation is affected by the state of the weather between the satellite and the ground station, so weather data may be used as link quality input data 130 with the link quality model 132 to estimate the link quality between the satellite 102 and a ground station. In particular, at frequencies over a few GHz, the effect of weather on attenuation of the signal can be significant (>10 dB at 10 GHz). For instance, rain can attenuate transmission signals by 10 to 20 dB in X, Ku, and Ka frequency bands. The effect also depends on the distance the signal covers below the clouds and/or through rain. The weather data used may include weather forecasts for a region in combination with models developed to predict this component of the loss. Further loss based on hardware of the satellite and/or the ground station is generally static and can be calibrated for in the link quality model 132 based on hardware data provided in the link quality input data 130.

The estimated loss data may be used to determine an optimal data rate that may be used by the satellite to transmit to the ground station. Different frequency ranges have tradeoffs with respect to data transmission, in that higher frequencies enable higher rates of data transmission but suffer from greater degrees of attenuation over distance and/or through atmospheric conditions, while lower frequencies suffer less attenuation but limit the rate of data transmission to lower values. The link quality model 132 may be configured to provide a highest data rate for a given link that is estimated to transmit data at or above a defined reliability threshold based on the described loss conditions as a measure of the link quality, enabling the schedule generator 118 to estimate a quantity of data the satellite 102 will be able to transmit along a particular link based on the link rate of transmission and the time during which the satellite will be within communication range of the ground station. Additionally, it should be understood that, in some examples, the determined data rate is not a constant rate throughout the period in which the satellite communicates to a ground station. The determined data rate may vary over time based on link quality or other features of the communication link. For instance, during a ten minute contact period, the data rate may begin at a low rate and increase as the satellite moves closer to the ground station until the satellite is at the closest point and then decrease as the satellite moves away from the ground station.

To generate the satellite transmission schedule 134, the satellite 102 is matched to ground stations of the subset 124 along the predicted orbit 122 using the satellite-station graph 128 and estimated quality of links based on the link quality model 132. Further, in some examples, the generation of the satellite transmission schedule 134 is further based on the presence of other satellites that may also make use of the same subset 124 of ground stations and/or on the satellite 102 transmitting data to more than one ground station of the subset 124. However, in many cases, ground stations may only be capable of point-to-point transmission links, meaning that the ground stations can only support receiving transmission links from one satellite at a time. Therefore, the satellite transmission schedule 134 is generated based on selecting a subset of edges of the graph 128 based on the estimated link quality associated with those edges for each instance of time during the predicted orbit 122 and then determining what data to transmit over the links represented by the selected subset of edges.

In some examples, the graph 128 is a weighted bipartite graph, such that the edge selection for the schedule 134 may classified as a bipartite matching problem. Two solutions may be used to solve the bipartite matching problem: (a) identifying a stable matching, and (b) identifying an optimal matching. An optimal matching may optimize the value achieved by the entire system (e.g., the most "valuable" data across all satellites and ground stations prioritized for transmission). However, in some cases, the DGS framework will be fragmented and, as a result, an optimal matching leaves room for a satellite-ground station pair to achieve suboptimal results locally. However, identifying a stable matching of the graph 128 may avoid such sub-optimal results and, as a result, may be more desirable in some situations. For instance, in a stable matching configuration, any satellite-ground station pair that breaks an assigned transmission link and forms new transmission links will derive less "value" in those transmissions that the value previously obtained from the first transmission link. In some examples, the Gale-Shapely algorithm may be used to solve the stable matching problem in the bipartite graph, which converges in $O(K^2)$, where K is the maximum value between the total quantity of satellites and the total quantity of ground stations. Additionally, or alternatively, the algorithm used to match satellites and secondary ground stations may be configured to optimize the matching for maximum throughput of data, maximum value of data transmitted, minimum latency of data transmitted, or some combination thereof. For instance, in an example where the matching algorithm is configured to optimize for latency of data transmitted, when selecting a link to match between multiple links, the algorithm may be configured to prioritize a link that will enable the transmission of a smaller quantity of data that has higher associated latency (e.g., it was collected earlier than other potential data) over a link that will enable the transmission of a larger quantity of data that has lower associated latency. Alternatively, in an example where the matching algorithm is configured to optimize for throughput of data transmitted (e.g., maximizing total data transmitted), when selecting a link to match between multiple links, the algorithm may be configured to prioritize a link that will enable the transmission of a larger quantity of data over a link that will enable the transmission of a smaller quantity of data, regardless of the associated latencies of the two sets of data. These optimizations may be combined in various ways as well. For instance, the algorithm may be configured to optimize for maximum throughput generally, but if data with an associated latency that exceeds a latency threshold is detected when matching links, the algorithm is configured to select the transmission link associated with that high latency data, regardless of the throughput optimization. In this way, the algorithm will generally select for maximum throughput, but it will also ensure that data does not become stale beyond the defined threshold while waiting to be transmitted to a ground station.

Further, the algorithm may be updated dynamically to account for changes, such as the occurrence of an event on the surface that increases the value of data associated with that location (e.g., monitoring a forest fire). The algorithm used may also be improved over time using machine learning techniques based on feedback that is provided (e.g., from a user or the ground stations) based on results of the matched satellite and secondary ground station pairs.

The selecting of transmission links as edges in the graph 128 may be performed for each instance of time in the time period associated with the predicted orbit 122 to capture dynamic changes of, for instance, the subset of ground stations for which the satellite 102 is in communication range. Further, the generation of the schedule 134 may include the selection of data to be transmitted along the selected transmission links by the satellite 102. The data selected may be the highest value data that the satellite currently has to transmit and that has not yet been transmitted. In examples where the quality of the data on the satellite 102 is used by the transmission scheduler 112 and quality data of other satellites is also used, the quality of the data on satellite 102 may result in the satellite 102 being scheduled to use higher quality transmission links or lower quality transmission links. For example, a satellite with higher quality data for transmission may be prioritized over the satellite 102 such that the satellite 102 is scheduled to use relatively lower quality transmission links, or satellite 102 may be prioritized over another satellite to use relatively higher quality transmission links based on having higher quality data for transmission.

In examples where multiple satellites are configured to use the secondary ground stations 108-110 as described herein, the generated satellite transmission schedule 134 may include schedule data for all the multiple satellites such that the data transmitted by the multiple satellites to the secondary ground stations 108-110 is optimized and such that multiple satellites do not attempt to transmit to the same ground station at the same time. In such cases, each satellite (e.g., satellite 102) is provided a portion of the schedule 134 that indicates the ground stations to which the satellite should transmit data and the times during which the satellite should transmit data to those ground stations. Additional information in the schedule provided to the satellite may include frequency ranges in which to transmit to the ground stations. The transmission scheduler 112 provides the satellite transmission schedule 134 or portions thereof to the primary ground station 106 and, when each satellite passes within communication range of the primary ground station 106, the primary ground station 106 transmits the portion of the schedule 134 to each satellite. Each of the satellites is then configured to transmit data down to the secondary ground stations 108-110 according to the received schedule 134 or portion thereof. In other examples, the transmission scheduler 112 may be configured to generate separate schedules 134 for each satellite and provide those separate schedules 134 to the respective satellites via the primary ground station 106 without departing from the description herein.

Further, in examples where the secondary ground stations 108-110 do not transmit to the satellite 102, the satellite 102 transmits data to the secondary ground stations 108-110 without receiving immediate acknowledgement of the ground stations receiving the transmitted data (e.g., "ack-free downlink" transmissions). As a result, tracking transmitted data that has been successfully received may be done in a different manner. In some examples, the secondary ground stations are configured to provide acknowledgements of receiving data from the satellite 102 to the primary ground station 106 and/or the transmission scheduler 112 through an Internet-based connection or other network connection. The acknowledgements provided by the secondary ground stations include identifiers of what data has been received from the satellite 102. For example, the acknowledgements include indicators of the location or area from which the data was captured, timestamps of when the data was captured, and/or any other identifier of the data that may be included in the data transmitted from the satellite 102. When the satellite 102 comes into range of the primary ground station 106 (or another primary ground station configured to transmit to the satellite 102), acknowledgements of the data received by the ground stations may be provided to the satellite 102 by the primary ground station as part of the communications between the satellite 102 and the primary ground station. Further, in some examples, where the data to be transmitted on the satellite 102 is used by the transmission scheduler 112 in generating the transmission schedule 134, the transmission scheduler 112 is configured to receive the acknowledgements of the received data from the secondary ground stations and those acknowledgements or associated indicators are provided to the satellite 102 as part of the next transmission schedule 134 that is generated and provided to the satellite 102. Upon the satellite 102 receiving acknowledgements of data that has been successfully received by the secondary ground stations, the satellite 102 may be configured to delete or otherwise remove the associated data and free up data storage space for use in storing additional capture data.

Figure 2:
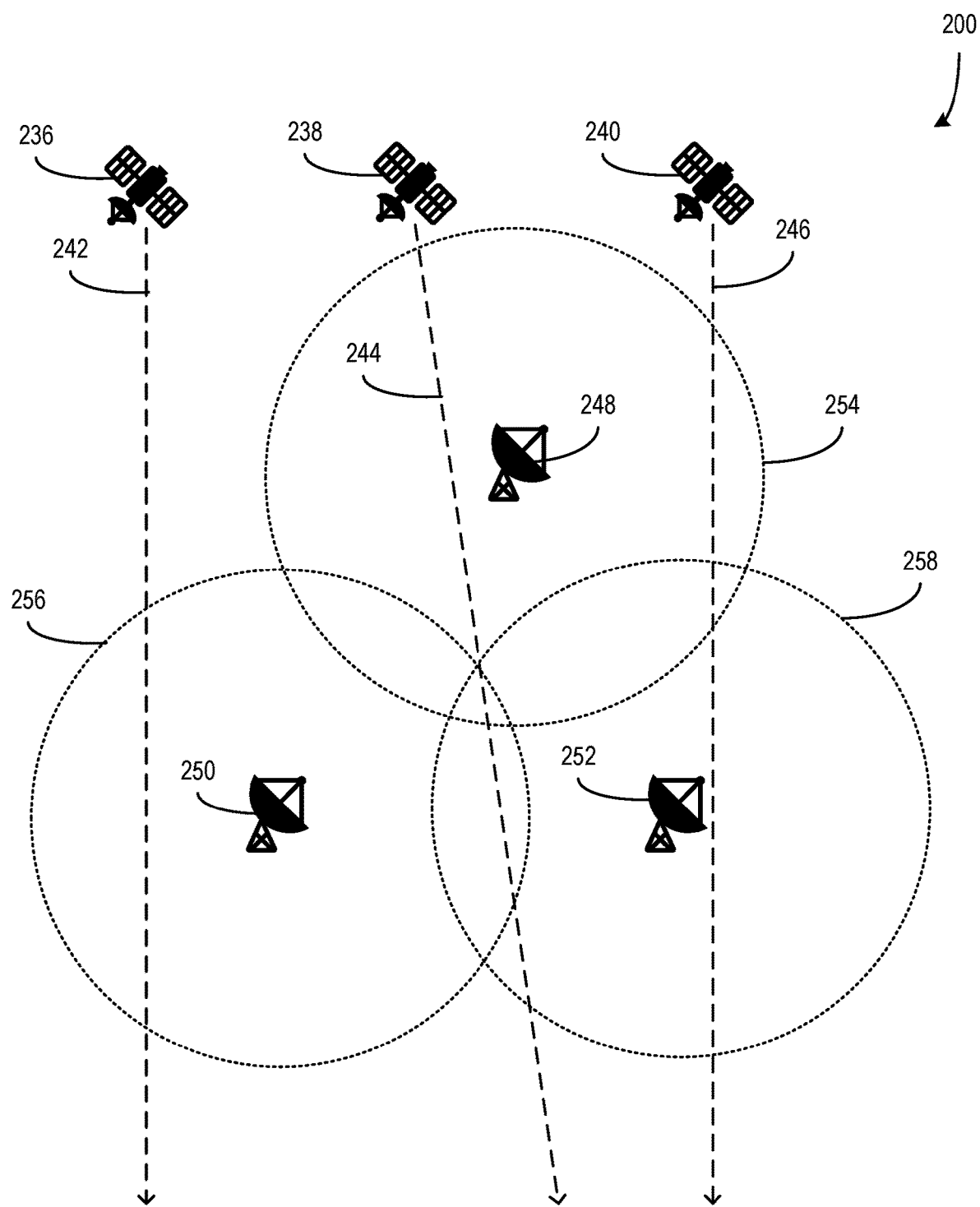
FIG. 2 is a diagram illustrating a system of multiple satellites configured to transmit data to multiple ground stations according satellite transmission schedules according to an embodiment.

FIG. 2 is a diagram illustrating a system 200 of multiple satellites 236, 238, and 240 configured to transmit data to multiple ground stations 248, 250, and 252 according satellite transmission schedules (e.g., satellite transmission schedule 134) according to an embodiment. In some examples, the system 200 further includes components of system 100, such as the primary ground station 106, which may be configured to transmit transmission schedules to the satellites 236, 238, and 240, and the transmission scheduler 112, which may be configured to generate the transmission schedules for the satellites 236, 238, and 240 with respect to the secondary ground stations 248, 250, and 252. In other examples, the system 200 may include more, fewer, or different satellites and/or more, fewer, or differently arranged ground stations without departing from the description. Further, the system 200 may include one or more primary ground stations and/or one or more transmission schedulers without departing from the description.

Each of the satellites 236, 238, and 240 travels along a separate orbit: satellite 236 travels along orbit 242, satellite 238 travels along orbit 244, and satellite 240 travels along orbit 246. The orbits of the satellites bring the satellites within communication range of one or more of the ground stations 248, 250, and 252 at varying times during travel along the orbits. Ground station 248 has a communication range 254, ground station 250 has a communication range 256, and ground station 252 has a communication range 258. Each of the satellites is provided a separate transmission schedule as described herein, such that each satellite is configured to transmit data to one or more of the ground stations when in communication range thereof. For instance, satellite 236 passes into communication range 256 of ground station 250 but it does not pass into range of either of the other ground stations, so the transmission schedule of the satellite 236 may include instructions to transmit data to the ground station 250 during the portion of the orbit 242 that places the satellite 236 in communication range 256 of the ground station 250. In other examples, the satellite 236 may also pass into communication range of other ground stations that are not illustrated, such that its transmission schedule includes instructions to transmit to such other ground stations, without departing from the description.

Satellite 238 travels along orbit 244 which brings it into communication range 254 of ground station 248, communication range 256 of ground station 250, and communication range 258 of ground station 252 at various times during traversal of the orbit 244. As a result, the transmission schedule of satellite 238 may include instructions to transmit data to each of the ground stations at times when the satellite is within communication range. Further, the transmission schedule may include transmitting data to more than one of the ground stations at a time when the satellite is in communication range of multiple ground stations (e.g., the satellite 238 passes through an area that puts it in communication range of all three ground stations 248, 250, and 252 at the same time and then in range of both ground stations 250 and 252).

Similarly, satellite 240 travels along orbit 246 which brings it into communication range 254 of ground station 248 and communication range 258 of ground station 252 at various times during traversal of orbit 246. The transmission schedule of the satellite 240 may include instructions to transmit data to each of the ground stations 248 and 252 at times when the satellite 240 is within communication range and those instructions may include, for instance, transmitting data to both ground stations at the same time when in communication range of both ground stations.

Further, as described herein, the transmission schedules of each of the satellites 236, 238, and 240 may be generated such that the data to be transmitted by the satellites (e.g., the priority or value of the data) and the relative locations of the other satellites at each instance of time during the traversal of the orbits affect the transmission schedule of each satellite, respectively. For instance, if the satellite 236 and the satellite 238 are predicted to be in range 256 of the ground station 250 at the same time, during that time, the transmission schedules of those two satellites may be generated such that satellite 236 is instructed to transmit data to the ground station 250 during that time and satellite 236 is instructed to transmit data to one of the other ground stations as a result of satellite 236 only being in range of ground station 250 and the satellite 238 being in range of more than one ground station. If the satellite 236 has higher value data to transmit than the satellite 238, that may also contribute to the satellite 236 being scheduled to transmit to ground station 250 during the time that both satellites are within communication range. Alternatively, if the satellite 238 has higher value data to transmit than the satellite 236, the transmission schedules of the satellites may be generated such that the satellite 238 is scheduled to transmit data to the ground station 250 during the time that both satellites 238 and 238 are in communication range 256 of the ground station 250. Additionally, or alternatively, the schedules may be generated such that satellite 236 is scheduled to transmit to the ground station 250 for a portion of the time and the satellite 238 is scheduled to transmit to the ground station 250 for the remainder of the time that both satellites are within communication range 256 of the ground station 250. It should be understood the transmission schedules of the satellites 236, 238, and 240 may be generated with instructions to the satellites to transmit data to the ground stations in other ways or patterns without departing from the description herein.

Figure 3:
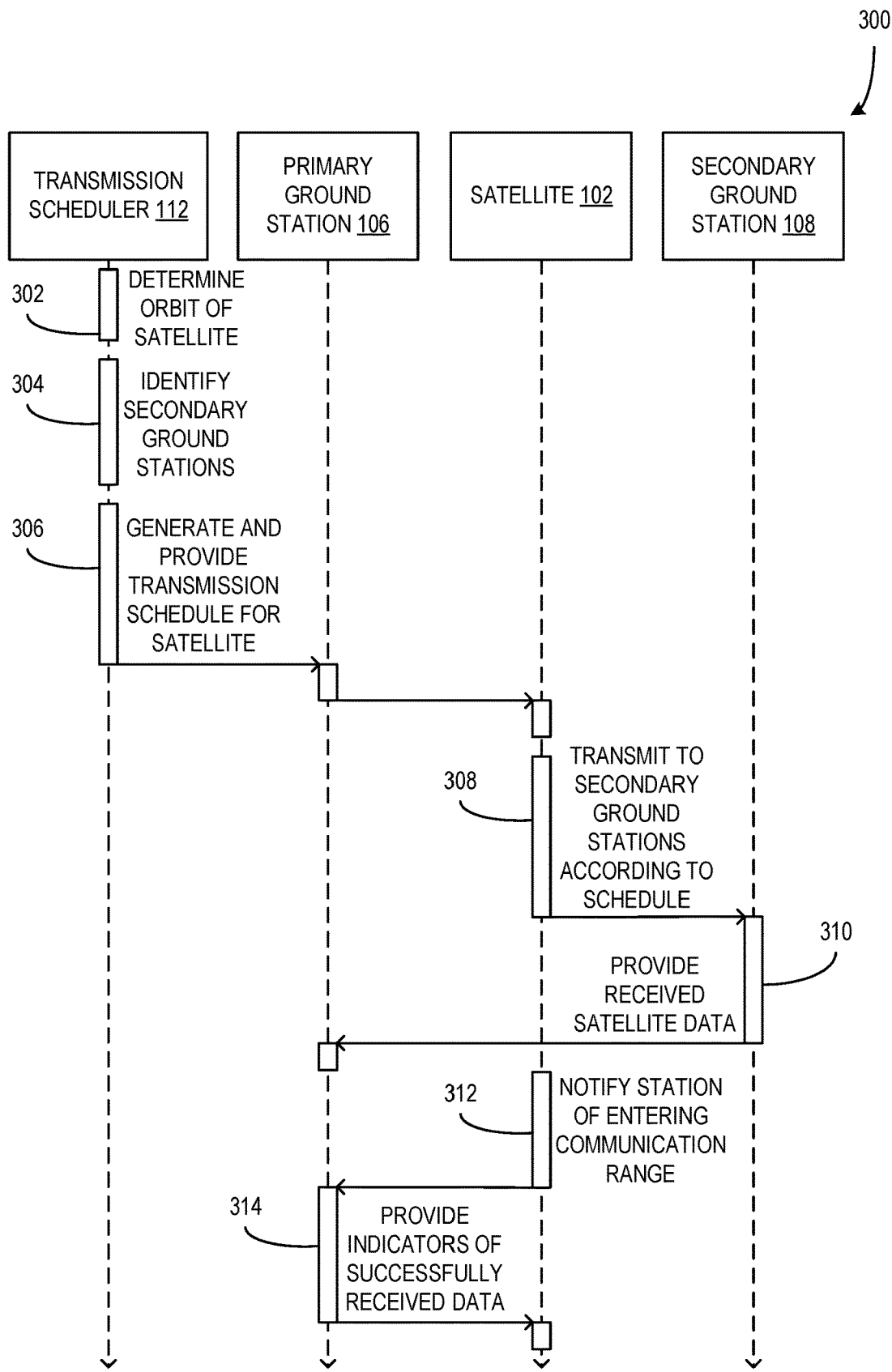
FIG. 3 is a diagram illustrating a computerized method for configuring a satellite to transmit data to a secondary ground station by generating a transmission schedule according to an embodiment.

FIG. 3 is a diagram illustrating a computerized method 300 for configuring a satellite 102 to transmit data to a secondary ground station 108 by generating a transmission schedule (e.g., a satellite transmission schedule 134) according to an embodiment. In some examples, the transmission scheduler 112, primary ground station 106, satellite 102, and secondary ground station 108 of computerized method 300 are in a system such as system 100 as described herein. At 302, the transmission scheduler 112 determines the orbit of the satellite 102. The determination of the orbit may be performed based on TLE data such as TLE data 120 and/or other data indicative of the satellite 102's path and/or trajectory.

At 304, the secondary ground stations that the satellite 102 will be in communication range with along determined orbit are identified. One of the identified ground stations is secondary ground station 108, though the subset of identified ground stations includes many other secondary ground stations as well, in most examples. The identification of the secondary ground stations at 304 may be based on distances between the ground station locations and the orbit of the satellite, as well as other factors, such as communication capabilities of the satellite and ground stations, frequency ranges in which the satellite and ground stations can communicate, or the like.

At 306, a transmission schedule is generated and provided to the satellite by the transmission scheduler 112 via the primary ground station 106. In some examples, the transmission schedule is generated based on a variety of factors, including the value of the data to be transmitted from the satellite and an estimated link quality factor associated with each possible transmission link between the satellite and a ground station of the identified subset of secondary ground stations. As described herein, the value of data to be transmitted may be based on the time at which the data was captured or collected by the satellite (e.g., how long ago the data was collected), the region or area from which the data was collected, or the like. Further, the link quality factor of each link may be based on several attributes of the associated transmission link, such as the distance between the satellite and ground station at the time of the link, the weather or other atmospheric effects that may be present and affect the transmission signal, hardware features and/or limitations of the satellite and/or the ground station, or the like.

At 308, after the satellite 102 has received the transmission schedule, it is configured to transmit to the secondary ground station 108 according to that schedule. In some examples, the satellite 102 is configured to transmit data to several secondary ground stations throughout the time period associated with the determined orbit with which the transmission schedule is associated. Transmitting data to the secondary ground station 108 according to the transmission schedule may include configuration or settings of the transmission process as defined in the schedule, such as transmitting a specific set or type of data to the ground station 108, transmitting data at a defined rate, transmitting data using a defined protocol, and/or transmitting data in a defined frequency band or range.

At 310, upon receiving the transmitted data from the satellite 102, the secondary ground station 108 provides the received satellite data and/or an acknowledgement of its reception to the primary ground station 106 via a network connection as described herein. In some examples, the received satellite data and/or associated acknowledgements are provided to the transmission scheduler 112 and the transmission scheduler 112 is configured to make use of the data when generating a future transmission schedule for the satellite 102 (e.g., instructing the satellite 102 regarding what data to transmit based on the acknowledgements of what data has already been received and/or providing acknowledgements or indicators (see 314 below) of what data has been received to enable the satellite 102 to delete or otherwise remove the successfully transmitted data from memory or data storage). It should be understood that, in examples where the satellite 102 is configured to transmit data to multiple secondary ground stations throughout its orbit, the provided satellite data of those multiple secondary ground stations may be provided to the primary ground station 106 and/or the transmission scheduler 112 as described herein.

At 312, upon the satellite 102 entering communication range with the primary ground station 106, the satellite 102 notifies the primary ground station 106 of its presence in communication range. Alternatively, or additionally, the primary ground station 106 may detect the satellite 102 entering communication range and then establish communication with the satellite 102. Once such a communication link is established between the primary ground station 106 and the satellite 102, the primary ground station 106 is configured to provide indicators of the successfully received data to the satellite 102 at 314. Further, during the time that the satellite 102 is within communication range of the primary ground station 106, the transmission scheduler 112 may provide a new transmission schedule to the satellite 102 via the primary ground station as described above. This transmission schedule may be generated based in part on the provided indicators of successfully received data.

In this way, the method 300 may be performed repeatedly for a system such as system 100 described herein. A primary ground station 106 and transmission scheduler 112 may be configured to provide a transmission schedule to the satellite 102 and/or other satellites that configures the satellites to transmit data to secondary ground stations such as secondary ground station 108 for one orbit, two orbits, or more around the Earth. Alternatively, or additionally, if multiple primary ground stations are included in the system, the transmission schedule of a satellite 102 may be updated each time the satellite 102 comes into contact with one of the primary ground stations. Alternative organizations or arrangements of primary ground stations, secondary ground stations, satellites, and/or transmission schedulers may be used without departing from the description.

Figure 4:
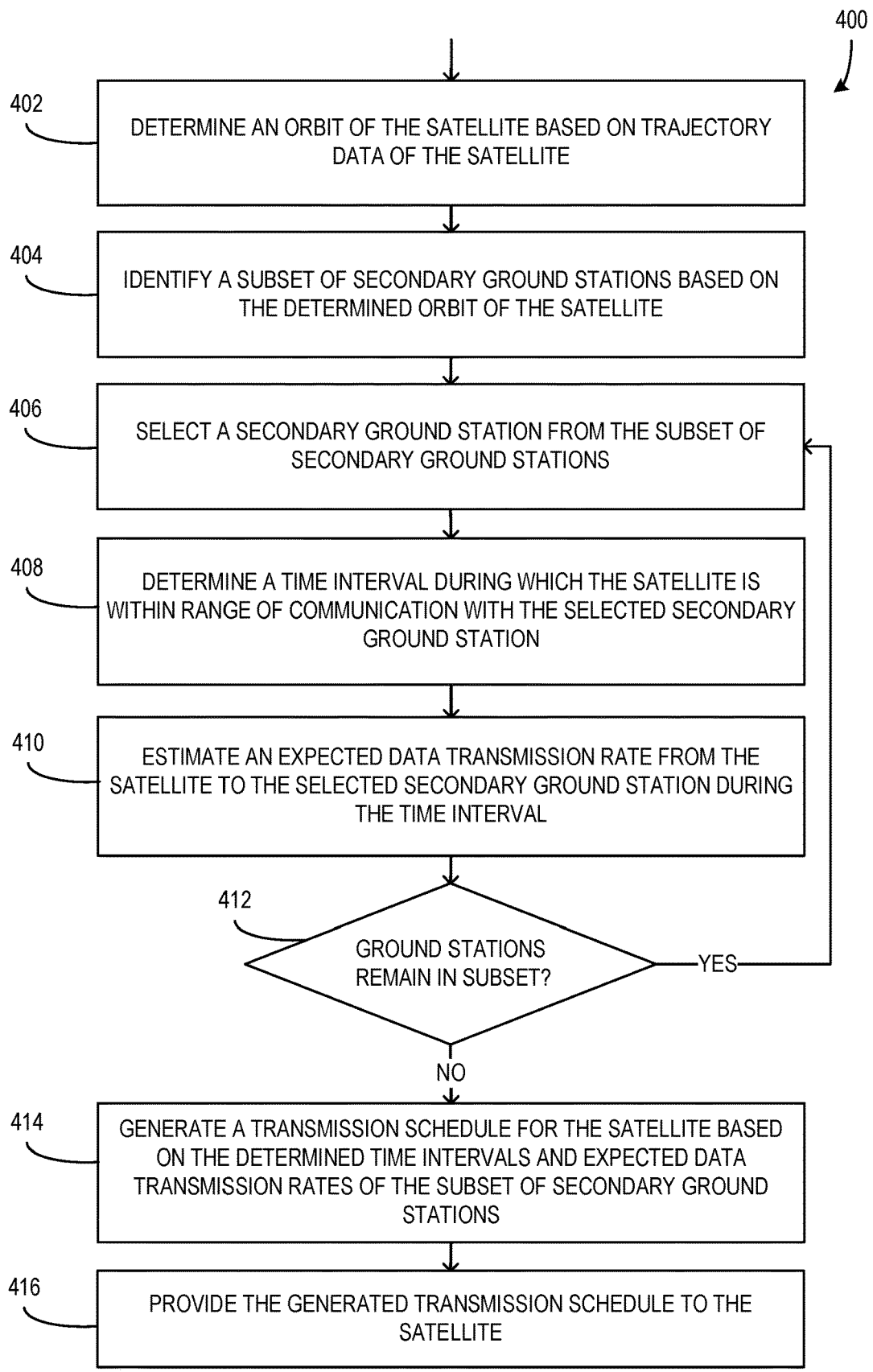
FIG. 4 is a flow chart illustrating a computerized method for transmitting data from a satellite using a primary ground station and a set of secondary ground stations according to an embodiment.

FIG. 4 is a flow chart illustrating a computerized method 400 for transmitting data from a satellite (e.g., satellite 102) using a primary ground station (e.g., primary ground station 106) and a set of secondary ground stations (e.g., secondary ground stations 108-110) according to an embodiment. In some examples, the computerized method 400 is executed or otherwise performed by a system such as system 100 and/or components of a system such as the transmission scheduler 112 of system 100. At 402, an orbit of the satellite is determined based on trajectory data of the satellite. In some examples, determining the orbit of the satellite is based on TLE data of the satellite. Further, the determined orbit may include data indicating the predicted orbit of the satellite over a defined time period in the future (e.g., 6 hours, 12 hours, 1 day, etc.).

At 404, a subset of secondary ground stations is identified based on the determined orbit of the satellite. In some examples, the subset of secondary ground stations are selected from the set of secondary ground stations based on the determined orbit of the satellite indicating that the satellite will be within communication range of the secondary ground stations of the identified subset. The communication range associated with a transmission link between the satellite and a secondary ground station of the subset of secondary ground stations may be based on the physical distance between the satellite and the ground station, the degree to which the satellite is above the horizon of the ground station, the type of transmission for which the satellite and ground station are both configured (e.g., transmission frequency range or band and/or transmission protocol).

At 406, a secondary ground station is selected from the subset of secondary ground stations. In some examples, the method 400 is configured to select each of the secondary ground stations of the subset in order to perform the processes described below with respect to 408 and 410. Thus, selecting a secondary ground station from the subset may include selecting one of the secondary ground stations that has not been previously selected.

At 408, a time interval during which the satellite is within range of communication with the selected secondary ground station. The time interval may be determined based on the communication range of the potential transmission link as described herein. The time interval may include a start timestamp indicating the time when the satellite moves into communication range with the selected ground station and an end timestamp indicating the time when the satellite moves out of communication range with the selected ground station. Alternatively, or additionally, the time interval may include a value indicating the length of time that the satellite will be within communication range with the selected ground station. In further examples, if the satellite and selected ground station are configured to communicate with each other using more than one frequency band and/or more than one communication protocol that have differing ranges of effective communication, the determined time interval may include a plurality of time intervals with one time interval per communication protocol and/or frequency band for communication.

At 410, an expected data transmission rate from the satellite to the selected secondary ground station is estimated for the determine time interval. The expected data transmission rate may be estimated based on the frequency range and/or communication protocol to be used for the transmission and an estimated loss of the associated transmission signal (e.g., the loss may be calculated based on distance, weather, hardware limitations and/or other factors as described herein).

At 412, if secondary ground stations remain in the subset that have not been selected, the process returns to 406 to select the next secondary ground station. Alternatively, if all the secondary ground stations have been selected, the process proceeds to 414.

At 414, a transmission schedule is generated for the satellite based on the determined time intervals and expected data transmission rates of the subset of secondary ground stations. In some examples, generating the transmission schedule includes determining, for the satellite, which secondary ground stations of the subset to transmit to, during what time intervals to transmit data, and/or which data to transmit. These determinations are included in the transmission schedule in the form of scheduled transmission instructions (e.g., instructions to transmit X data to secondary ground station Y at Z time) such that the satellite is configured to transmit data according to the scheduled transmission instructions during the course of the determined orbit. Further, selection of the data to transmit may be based on a value factor associated with different portions of data to be transmitted from the satellite, such that data with higher relative value factor is selected for transmission before data with lower relative value factor in most cases. The value factors of data to be transmitted may be based on a time at which the data was collected and/or a location or event with which the data is associated.

Further, in some examples, generating the transmission schedule includes identifying data from the satellite that has previously been successfully received (e.g., based on receiving acknowledgements from secondary ground stations) and including acknowledgements associated with the successfully received data with the transmission schedule. As a result, the satellite may be configured to delete or otherwise remove the successfully received data from memory or data storage, making space for additional data to be collected.

At 416, the generated transmission schedule is provided to the satellite. In some examples, the transmission schedule is provided to the satellite via transmission from a primary ground station, such as primary ground station 106.

Figure 5:
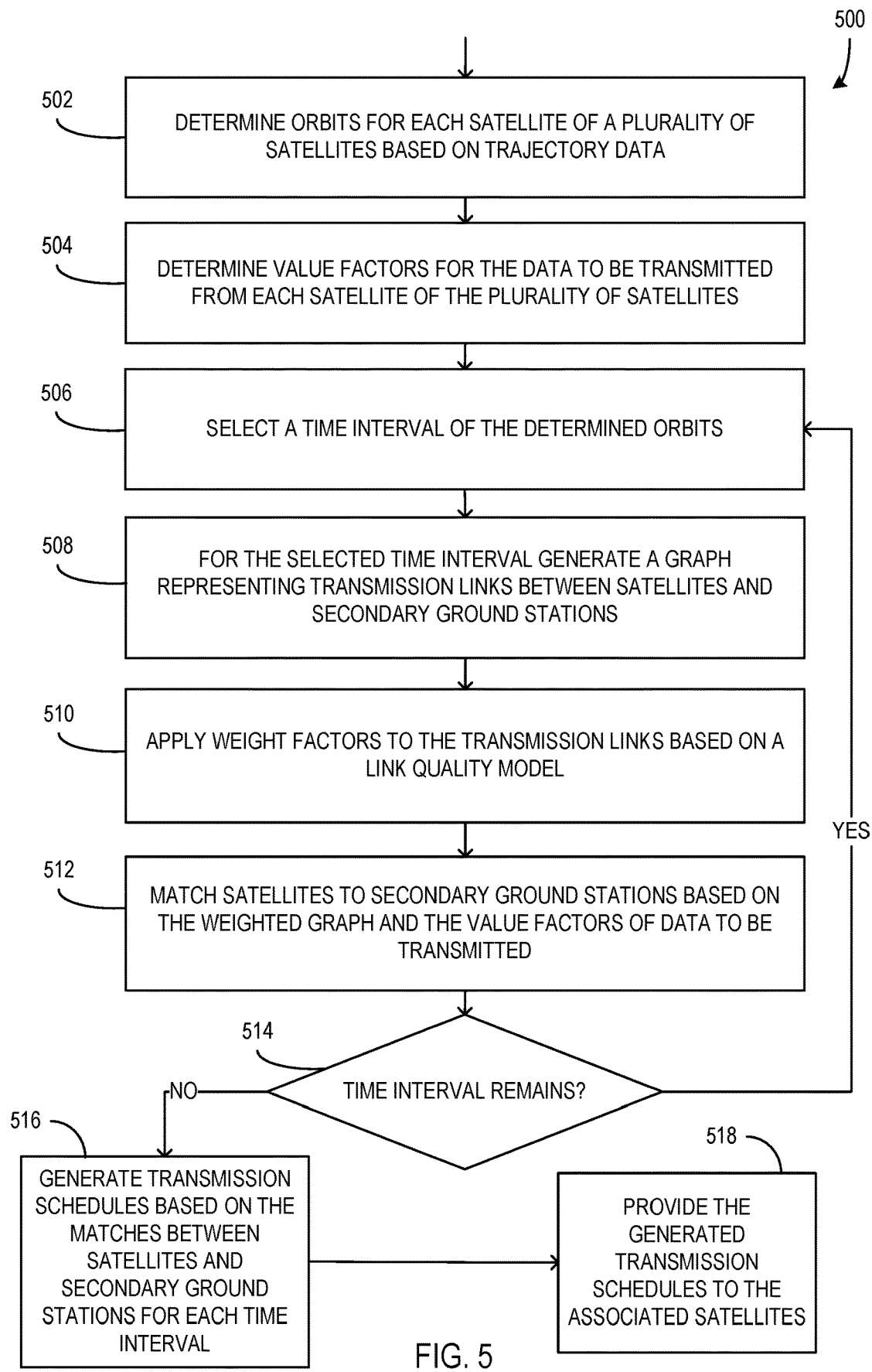
FIG. 5 is a flow chart illustrating a computerized method for coordinating transmission from satellites using a primary ground station and as set of secondary ground stations according to an embodiment.

FIG. 5 is a flow chart illustrating a computerized method 500 for coordinating transmission from satellites (e.g., satellite 102) using a primary ground station (e.g., primary ground station 106) and as set of secondary ground stations (e.g., secondary ground stations 108-110) according to an embodiment. In some examples, the computerized method 400 is executed or otherwise performed by a system such as system 100 and/or components of a system such as the transmission scheduler 112 of system 100. At 502, orbits for each satellite of a plurality of satellites are determined based on trajectory data of those satellites and, at 504, value factors for the data to be transmitted from each satellite of the plurality of satellites are determined. In some examples, the value factors may be determined based on the a time at which the data was collected, a region or location from which the data was collected, and/or an event with which the collected data may be associated (e.g., data collected to monitor a forest fire may be tagged as having a higher value than other data).

At 506, a time interval of the determined orbits is selected. The determined orbits are associated with a time period during which the satellites travel around the Earth according to the determined orbits. Because the satellites change positions throughout the time period and enter and exit communication ranges of various ground stations throughout the period, the time period is divided into multiple time intervals (e.g., 30 second intervals, 10 second intervals, 5 second intervals) so that the coordination of transmissions can be updated to reflect the changes in positions of the satellites.

At 508, a graph is generated that represents transmission links between satellites and secondary ground stations for the selected time interval. In the generated graph, the satellites and secondary ground stations are nodes and the potential transmission links are edges between the notes. An edge may be included in the graph between a satellite and a secondary ground station when the satellite will be in communication range of the secondary ground station during the associated time interval. In the graph, each satellite may be linked to multiple secondary ground stations by edges and/or each secondary ground station may be linked to multiple satellites by edges. While a single satellite may be able to transmit to multiple ground stations at the same time, in some examples, each ground station is configured to only receive one transmission from a satellite at a time, so transmission links to each secondary ground station must be selected for each time interval as described herein.

At 510, weight factors are applied to the transmission links based on a link quality model. In some examples, the link quality model is configured to estimate loss of a link signal based on various effects, such as signal loss over distance, signal loss from weather or atmospheric conditions, and/or signal loss based on hardware limitations of the satellite and/or the ground station. The estimated link quality may also be used to determine a maximum effective data rate that may be expected when transmitting on the associated link. Weight factors may be applied to transmission links of the graph based on the value factors of data to be transmitted by the satellites and the link quality of the links from the link quality model.

At 512, satellites and secondary ground stations are matched based on the weighted graph and the value factors of data to be transmitted by the satellites. A subset of the weighted edges of the graph are chosen to be used for transmission through the matching process. In some examples, the matching is performed in such a way that the transmission of data from satellites to secondary ground stations is optimized with respect to the value factor and quantity of data to be transmitted, as described herein.

At 514, if one or more time intervals of the time period of the determined orbits remains to be processed, the process returns to 506 to select another time interval. Alternatively, if no time intervals remain to be processed, the process proceeds to 516.

At 516, transmission schedules are generated based on the matches between the satellites and secondary ground stations for each interval. In some examples, a transmission schedule is generated for each satellite that configures the satellite to transmit to one or more secondary ground stations at various time intervals of the determined orbit of the satellite, as described herein.

At 518, the generated transmission schedules are provided to the associated satellites. As previously described, in some examples, this may include providing the transmission schedules to a primary ground station such that the primary ground station transmits the transmission schedules to the associated satellites when they come into communication range of the primary ground station.

Additional Example Scenarios

Aspects of the disclosure enable various additional scenarios, such as next described.

In an example, a network of ground stations and a transmission scheduler are configured to coordinate the reception of transmitted data from a plurality of LEO satellites. The scheduler obtains the TLE data of the plurality of satellites and calculates predicted orbits for each of the satellites for the next 6-hour period. Based on the predicted orbits, a subset of secondary ground stations is identified that include the secondary ground stations that at least one of the satellites is predicted to be in communication range of in the 6-hour period.

The scheduler then generates a satellite-station graph for each 10-second interval of the 6-hour period based on the predicted orbits and the subset of secondary ground stations. Each of the graphs includes nodes representing satellites and ground stations and edges representing potential transmission links therebetween. The potential transmission links are analyzed using a link quality model to determine an estimated link quality and an associated data transmission rate that is predicted for the link during the interval.

For each graph, the scheduler matches satellites to secondary ground stations based on the value factors associated with the data to be transmitted. The scheduler may make matches to optimize the general throughput of data, the mean latency of data, the peak latency of data, or the like. Based on those matches, satellite transmission schedules are generated for each satellite. The schedules are provided to one or more primary ground stations of the network and each satellite is sent the associated schedule when it comes into range of one of the one or more primary ground stations.

Later, as the satellites transmit data according to the generated transmission schedules, the secondary ground stations that receive data from the satellites send acknowledgements associated therewith to the primary ground stations of the network. When each satellite enters communication range of a primary ground station and establishes a communication link, the primary ground station provides the acknowledgements of the successfully received data, enabling the satellite to delete that data from its memory or data storage. In some examples, acknowledgements may be relayed as bits that represent 20 MB portions of data from the satellites, though this size is configurable and may be configured based on type of data, transmission rate of data, or the like. Further, if a portion of data is not successfully received and, as a result, no acknowledgement is provided to the satellite, the satellite may be configured to resend the portion of data during another pass over the secondary ground stations.

In another example, a DGS network is configured as a distributed architecture as described herein. The DGS includes a combination of two to six transmit-capable ground stations (e.g., primary ground stations) and more than 100 receive-only ground stations (e.g., secondary ground stations) distributed around the Earth. The receive-only ground stations are organically deployed by end-users and are low-cost. Alternatively, or additionally, the primary ground stations are existing expensive ground stations which are coupled with secondary ground stations which are low cost. The secondary ground stations may allow for low-data rate downloads and seldom do uploads (unlike receive-only ground stations, which never do any uploads).

In some examples, the receive-only ground stations are randomly deployed across the globe. However, only a subset of these stations is used to download the data from the satellite depending on the output of the optimization operations performed by the scheduler.

Experimental Evaluation

A simulated, experimental DGS system was evaluated using data collected from deployments of open-source Satellite Networked Open Ground Station (SatNOGS) ground stations. SatNOGS is deployed by independent amateur radio enthusiasts using software defined radios. The ground stations listen to broadcast signals transmitted by satellites (like National Oceanic and Atmospheric Administration (NOAA) weather satellites). The observation data is logged in an open database. The data was downloaded from all ground station-satellite links for a month-long period. Note that, SatNOGS ground stations do not include any of the routing mechanism, link quality prediction, or other algorithms described herein with respect to DGS. The SatNOGS data was used to validate the described algorithms through a combination of simulation and real data. Ground stations that have been operational and have made at least a thousand observations since installation were selected for the dataset. In the experimental dataset, there were a total of 173 ground stations and 259 satellites.

For each ground station location and each time instance, weather data was collected using the Dark Sky weather API. A majority of the ground stations operate in the sub-500 MHz frequency bands, and some (approx. 20%) support the L-band (1.5 to 1.75 GHz). Since Earth Observation satellites use the X-band (>8 GHz) to download their data, the data from the SatNOGS database was not used to report the Signal-to-Noise Ratio (SNR) for satellite-ground station links. The SatNOGS measurements were used to validate other aspects of the described design like orbit calculation, observation times, satellite-ground station link duration, etc. For SNR estimation, data rate estimates obtained using the loss estimation process described above with respect to the link quality model 132 were used. High frequency SNRs were not validated with hardware measurements, but the link quality model was validated for lower frequencies using the SatNOGS measurements.

For simulating data transfer, each satellite generated 100 GB of data per day, spread out uniformly in time. However, since secondary ground stations as described may be low-complexity, large dishes (5 meters or more) typically used by commercial ground stations would not be used. The ground stations in the experiment were simulated to have small, 1-meter diameter, dish antennas. This reduces the SNR of each of the ground stations by 6 dB. Furthermore, the ground stations as described do not use 6-channel receivers, but rather use a single-channel receiver.

Baseline: Current state-of-the-art ground stations were used as a baseline. This method uses 6 parallel channels as well as high-end receivers with 4 m diameter dish antennas. 5 of these high-end ground stations were modeled and simulated across the planet. Each of the baseline ground stations achieved a median throughput that is 10 times larger than the throughput achieved by a single DGS secondary ground station.

Figure 6:
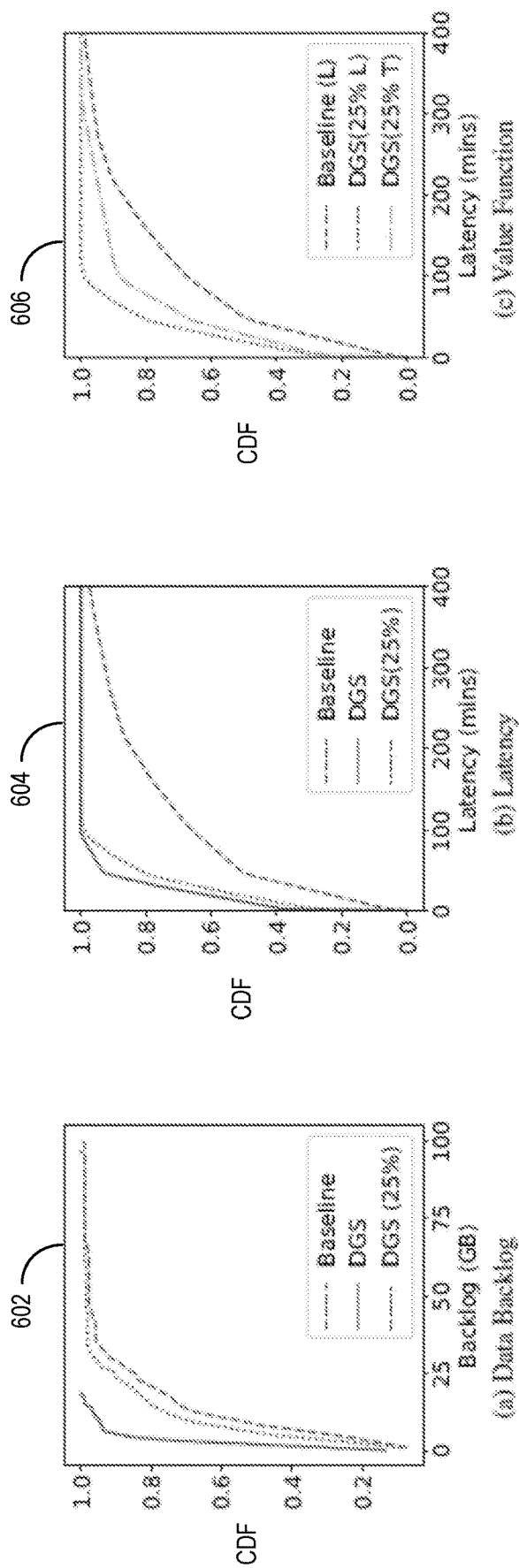
FIG. 6 illustrates performance results of simulated system compared to a baseline including (a) data backlog, (b) latency, and (c) value function according to an embodiment.

Data Transfer: First, the ability to downlink/transmit data from 259 satellites for the baseline high-fidelity ground stations and the DGS distributed ground station nodes were compared and the results are illustrated as cumulative distribution functions (CDF) in the graph 602 of FIG. 6, referred to as (a) data backlog. Two variants of DGS were compared: DGS and DGS (25%). DGS used all of 173 ground stations in the network to download data. In DGS (25%), the number of ground stations was reduced to 25% to highlight the benefit provided by geographic diversity alone. In DGS (25%), the total network capacity is lower than the baseline. The amount of data not downloaded from the satellites at the end of the day was measured. The median (90-percentile, 99-percentile) backlog for the baseline was 8.5 GB (28.9 GB, 80.7 GB). This means that for 10% of the satellites, 28.9 GB data was yet to be downloaded and for 1%, 80.7 GB data was in the backlog. In contrast, for DGS, the corresponding backlog was 1.9 GB (5.3 GB, 15.6 GB). This means that DGS improved the backlog by a factor of 5 for the median as well as the 90-th and 99-th percentile. Even when limiting DGS to 25% of its ground stations, with total link capacity less than the baseline, the backlog was 5.7 GB (23.4 GB, 74.3 GB). This highlights that a subset of the gains may be achieved because of geographic diversity alone, i.e. (a) geographic spread means less satellites conflict at a single ground station, and (b) the distributed nature of DGS ensures that degradation of individual links, for example due to weather, do not severely impact the entire system.

Latency: The three methods described above: baseline, DGS, and DGS (25%) were compared in terms of latency and the results are illustrated as CDFs in the graph 604 in FIG. 6, referred to as (b) latency. The time elapsed between data capture (say image capture) and data reception at the ground station was measured. The baseline method with high fidelity ground station achieved a median (90-percentile, 99-percentile) latency of 48 minutes (257 minutes, 441 minutes). In contrast, DGS achieved a latency of 11 minutes (44 minutes, 88 minutes). Even with 25% deployment, DGS achieved a latency of 19 minutes (68 minutes, 99 minutes). This result highlights a key benefit of DGS's geographically distributed design. Even when the overall link capacity of the system is lower, it achieves a much lower latency (4-5 times lower for different metrics). This is because a satellite is likely to encounter multiple ground stations during its orbit, so it can transmit its data sooner.

Adaptability of Value Function: As described herein, a value function may be used to modulate the behavior of DGS. Tuning the value function was tested for any tangible effects. So far, for all the above results, the value function was tuned to optimize for latency. Tuning the value function to optimize for throughput was also tested. Three different methods were evaluated: DGS(L)—DGS optimized for latency, DGS(T)—DGS optimized for throughput, and baseline (L)—baseline optimized for latency and the results are illustrated as CDFs in the graph 606 in FIG. 6, referred to as (c) value function. When DGS is optimized for throughput, the median latency went up from 19 mins to 28 mins. This shows that tuning the value function can indeed improve the intended outcome and that DGS is an agile framework for distributed ground station configuration. As described, this function can be further tuned to prioritize data for geographic regions, natural disasters, or to use a bidding system to bid on ground station time. Finally, note that even the throughput optimized system with 25% of ground stations used had a lower latency than the full baseline system optimized for latency. This, once again, highlights the low-latency advantage of DGS due to its geographically distributed nature.

Exemplary Operating Environment

Figure 7:
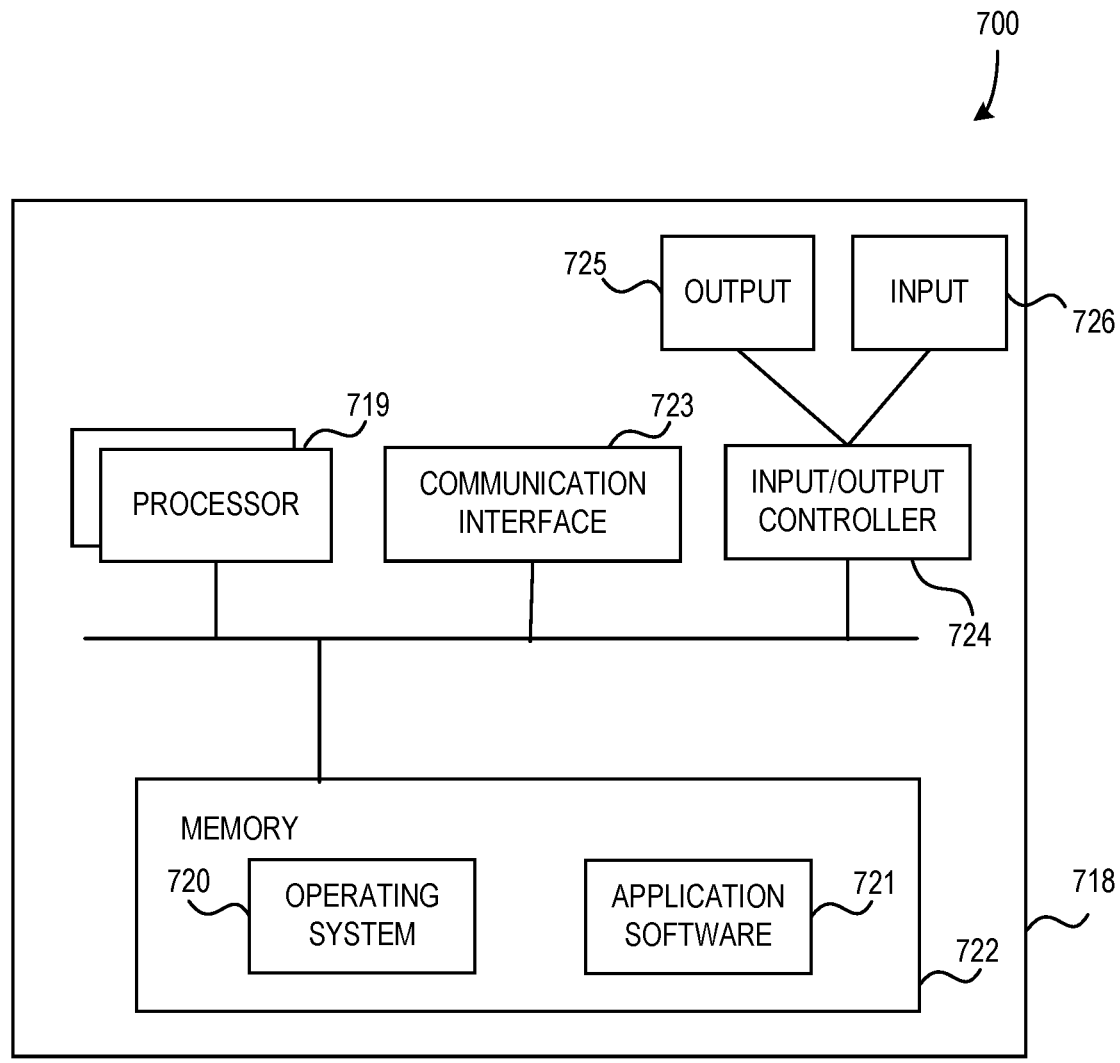
FIG. 7 illustrates a computing apparatus according to an embodiment as a functional block diagram.

The present disclosure is operable with a computing apparatus according to an embodiment as a functional block diagram 700 in FIG. 7. In an embodiment, components of a computing apparatus 718 may be implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. Platform software comprising an operating system 720 or any other suitable platform software may be provided on the apparatus 718 to enable application software 721 to be executed on the device. According to an embodiment, generating and providing transmission schedules to satellites to configure the satellites to transmit data to secondary ground stations throughout an orbit as described herein may be accomplished by software, hardware, and/or firmware.

Computer executable instructions may be provided using any computer-readable media that are accessible by the computing apparatus 718. Computer-readable media may include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that the storage may be distributed or located remotely and accessed via a network or other communication link (e.g. using a communication interface 723).

The computing apparatus 718 may comprise an input/output controller 724 configured to output information to one or more output devices 725, for example a display or a speaker, which may be separate from or integral to the electronic device. The input/output controller 724 may also be configured to receive and process an input from one or more input devices 726, for example, a keyboard, a microphone, or a touchpad. In one embodiment, the output device 725 may also act as the input device. An example of such a device may be a touch sensitive display. The input/output controller 724 may also output data to devices other than the output device, e.g. a locally connected printing device. In some embodiments, a user may provide input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for transmitting data from a satellite using a primary ground station and a set of secondary ground stations comprises: at least one processor; and at least one memory comprising computer program code, the at least one memory and the computer program code configured to, with the at least one processor, cause the at least one processor to: determine an orbit of the satellite over a schedule period based on trajectory data of the satellite; identify a subset of secondary ground stations from the set of secondary ground stations based on the determined orbit of the satellite, wherein secondary ground stations are configured to receive from the satellite and not transmit to the satellite, wherein the identified subset of secondary ground stations are within communication range of the determined orbit of the satellite; generate a transmission schedule associated with the satellite and the subset of secondary ground stations, the generating including, for each secondary ground station of the subset of secondary ground stations: determining a time interval during which the satellite is within communication range of the secondary ground station; estimating an expected rate of data transmission from the satellite to the secondary ground station during the determined time interval; and including the time interval and the expected rate of data transmission in the transmission schedule in association with the secondary ground station; and provide the generated transmission schedule to the satellite via the primary ground station, wherein the primary ground station is configured to receive from the satellite and transmit to the satellite, whereby the satellite is configured to transmit data to the subset of secondary ground stations based on the generated transmission schedule.

An example computerized method for transmitting data from a satellite using a primary ground station and a set of secondary ground stations comprises: determining, by a processor, an orbit of the satellite over a schedule period based on trajectory data of the satellite; identifying, by the processor, a subset of secondary ground stations from the set of secondary ground stations based on the determined orbit of the satellite, wherein secondary ground stations are configured to receive from the satellite and not transmit to the satellite, wherein the identified subset of secondary ground stations are within communication range of the determined orbit of the satellite; generating, by the processor, a transmission schedule associated with the satellite and the subset of secondary ground stations, the generating including, for each secondary ground station of the subset of secondary ground stations: determining a time interval during which the satellite is within communication range of the secondary ground station; estimating an expected rate of data transmission from the satellite to the secondary ground station during the determined time interval; and including the time interval and the expected rate of data transmission in the transmission schedule in association with the secondary ground station; and providing, by the processor, the generated transmission schedule to the satellite via the primary ground station, wherein the primary ground station is configured to receive from the satellite and transmit to the satellite, whereby the satellite is configured to transmit data to the subset of secondary ground stations based on the generated transmission schedule.

One or more non-transitory computer storage media have computer-executable instructions for transmitting data from a satellite using a primary ground station and a set of secondary ground stations, upon execution by a processor, causes the processor to at least: determine an orbit of the satellite over a schedule period based on trajectory data of the satellite; identify a subset of secondary ground stations from the set of secondary ground stations based on the determined orbit of the satellite, wherein secondary ground stations are configured to receive from the satellite and not transmit to the satellite, wherein the identified subset of secondary ground stations are within communication range of the determined orbit of the satellite; generate a transmission schedule associated with the satellite and the subset of secondary ground stations, the generating including, for each secondary ground station of the subset of secondary ground stations: determining a time interval during which the satellite is within communication range of the secondary ground station; estimating an expected rate of data transmission from the satellite to the secondary ground station during the determined time interval; and including the time interval and the expected rate of data transmission in the transmission schedule in association with the secondary ground station; and provide the generated transmission schedule to the satellite via the primary ground station, wherein the primary ground station is configured to receive from the satellite and transmit to the satellite, whereby the satellite is configured to transmit data to the subset of secondary ground stations based on the generated transmission schedule.

Alternatively, or in addition to the other examples described herein, examples include any combination of the following:

wherein the satellite is one of a plurality of satellites configured to transmit data to the set of secondary ground stations; wherein generating the transmission schedule associated with the satellite includes generating a transmission schedule that schedules data transmissions from each satellite of the plurality of satellites to the set of secondary ground stations; and wherein generating the transmission schedule that schedules data transmissions from each satellite of the plurality of satellites includes, for each secondary ground station of the set of secondary ground stations, preventing multiple satellites of the plurality of satellites from simultaneously transmitting data to the secondary ground station.

wherein generating the transmission schedule that schedules data transmissions from each satellite of the plurality of satellites further includes: comparing a first value factor of data on a first satellite of the plurality of satellites and a second value factor of data on a second satellite of the plurality of satellites, wherein determined orbits of the first satellite and second satellite indicate the first satellite and second satellite will be in communication range of a target secondary ground station of the set of secondary ground stations during a target time interval; selecting the first satellite based on comparing the first value factor and the second value factor indicating the first value factor is higher than the second value factor; and scheduling the selected first satellite to transmit to the target secondary ground station during the target time interval.

wherein the first value factor and the second value factor are based on at least one of the following: a time at which the data was collected and a location with which the data is associated.

further comprising: receiving, by the processor, from at least one secondary ground station of the subset of secondary ground stations, an acknowledgement of data received by the at least one secondary ground station from the satellite; and providing, by the processor, the acknowledgement to the satellite via the primary ground station based on the satellite entering a communication range of the primary ground station.

further comprising: generating, by the processor, an updated transmission schedule associated with the satellite and the subset of secondary ground stations, wherein generating the updated transmission schedule includes generating instructions to instruct the satellite to transmit data for which no acknowledgement has been received.

wherein estimating the expected rate of data transmission is based on at least one of the following: a distance between the satellite and the secondary ground station, weather conditions between the satellite and the secondary ground station, and hardware-based signal loss of the satellite and the secondary ground station.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for determining, by a processor, an orbit of the satellite over a schedule period based on trajectory data of the satellite; an exemplary means for identifying, by the processor, a subset of secondary ground stations from the set of secondary ground stations based on the determined orbit of the satellite, wherein secondary ground stations are configured to receive from the satellite and not transmit to the satellite, wherein the identified subset of secondary ground stations are within communication range of the determined orbit of the satellite; an exemplary means for generating, by the processor, a transmission schedule associated with the satellite and the subset of secondary ground stations, the generating including, for each secondary ground station of the subset of secondary ground stations: an exemplary means for determining a time interval during which the satellite is within communication range of the secondary ground station; an exemplary means for estimating an expected rate of data transmission from the satellite to the secondary ground station during the determined time interval; and an exemplary means for including the time interval and the expected rate of data transmission in the transmission schedule in association with the ground station; and an exemplary means for providing, by the processor, the generated transmission schedule to the satellite via the primary ground station, wherein the primary ground station is configured to receive from the satellite and transmit to the satellite, whereby the satellite is configured to transmit data to the subset of secondary ground stations based on the generated transmission schedule.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for transmitting data from a satellite using a primary ground station and a set of secondary ground stations, the system comprising:
   at least one processor; and
   at least one memory comprising computer program code, the at least one memory and the computer program code configured to, with the at least one processor, cause the at least one processor to:
   determine an orbit of the satellite over a schedule period based on trajectory data of the satellite;
   identify a subset of secondary ground stations from the set of secondary ground stations based on the determined orbit of the satellite, wherein secondary ground stations are configured to receive from the satellite and not transmit to the satellite, wherein the identified subset of secondary ground stations are within communication range of the determined orbit of the satellite;

generate a transmission schedule associated with the satellite and the subset of secondary ground stations, the generating including, for each secondary ground station of the subset of secondary ground stations:
    determining a time interval during which the satellite is within communication range of the secondary ground station;
    estimating an expected rate of data transmission from the satellite to the secondary ground station during the determined time interval; and
    including the time interval and the expected rate of data transmission in the transmission schedule in association with the secondary ground station; and provide the generated transmission schedule to the satellite via the primary ground station, wherein the primary ground station is configured to receive from the satellite and transmit to the satellite, whereby the satellite is configured to transmit data to the subset of secondary ground stations based on the generated transmission schedule.

2. The system of claim 1, wherein the satellite is one of a plurality of satellites configured to transmit data to the set of secondary ground stations;
    wherein generating the transmission schedule associated with the satellite includes generating a transmission schedule that schedules data transmissions from each satellite of the plurality of satellites to the set of secondary ground stations; and
    wherein generating the transmission schedule that schedules data transmissions from each satellite of the plurality of satellites includes, for each secondary ground station of the set of secondary ground stations, preventing multiple satellites of the plurality of satellites from simultaneously transmitting data to the secondary ground station.

3. The system of claim 2, wherein generating the transmission schedule that schedules data transmissions from each satellite of the plurality of satellites further includes:
    comparing a first value factor of data on a first satellite of the plurality of satellites and a second value factor of data on a second satellite of the plurality of satellites, wherein determined orbits of the first satellite and second satellite indicate the first satellite and second satellite will be in communication range of a target secondary ground station of the set of secondary ground stations during a target time interval;
    selecting the first satellite based on comparing the first value factor and the second value factor indicating the first value factor is higher than the second value factor; and
    scheduling the selected first satellite to transmit to the target secondary ground station during the target time interval.

4. The system of claim 3, wherein the first value factor and the second value factor are based on at least one of the following: a time at which the data was collected and a location with which the data is associated.

5. The system of claim 1, the at least one memory and the computer program code configured to, with the at least one processor, further cause the at least one processor to:
    receive from at least one secondary ground station of the subset of secondary ground stations, an acknowledgement of data received by the at least one secondary ground station from the satellite; and provide the acknowledgement to the satellite via the primary ground station based on the satellite entering a communication range of the primary ground station.

6. The system of claim 5, the at least one memory and the computer program code configured to, with the at least one processor, further cause the at least one processor to:
    generate an updated transmission schedule associated with the satellite and the subset of secondary ground stations, wherein generating the updated transmission schedule includes generating instructions to instruct the satellite to transmit data for which no acknowledgement has been received.

7. The system of claim 1, wherein estimating the expected rate of data transmission is based on at least one of the following: a distance between the satellite and the secondary ground station, weather conditions between the satellite and the secondary ground station, and hardware-based signal loss of the satellite and the secondary ground station.

8. A computerized method for transmitting data from a satellite using a primary ground station and a set of secondary ground stations, the computerized method comprising:
    determining, by a processor, an orbit of the satellite over a schedule period based on trajectory data of the satellite;
    identifying, by the processor, a subset of secondary ground stations from the set of secondary ground stations based on the determined orbit of the satellite, wherein secondary ground stations are configured to receive from the satellite and not transmit to the satellite, wherein the identified subset of secondary ground stations are within communication range of the determined orbit of the satellite;
    generating, by the processor, a transmission schedule associated with the satellite and the subset of secondary ground stations, the generating including, for each secondary ground station of the subset of secondary ground stations:
        determining a time interval during which the satellite is within communication range of the secondary ground station;
        estimating an expected rate of data transmission from the satellite to the secondary ground station during the determined time interval; and
        including the time interval and the expected rate of data transmission in the transmission schedule in association with the secondary ground station; and
    providing, by the processor, the generated transmission schedule to the satellite via the primary ground station, wherein the primary ground station is configured to receive from the satellite and transmit to the satellite, whereby the satellite is configured to transmit data to the subset of secondary ground stations based on the generated transmission schedule.

9. The computerized method of claim 8, wherein the satellite is one of a plurality of satellites configured to transmit data to the set of secondary ground stations;
    wherein generating the transmission schedule associated with the satellite includes generating a transmission schedule that schedules data transmissions from each satellite of the plurality of satellites to the set of secondary ground stations; and
    wherein generating the transmission schedule that schedules data transmissions from each satellite of the plurality of satellites includes, for each secondary ground station of the set of secondary ground stations, preventing multiple satellites of the plurality of satellites from simultaneously transmitting data to the secondary ground station.

10. The computerized method of claim 9, wherein generating the transmission schedule that schedules data transmissions from each satellite of the plurality of satellites further includes:
comparing a first value factor of data on a first satellite of the plurality of satellites and a second value factor of data on a second satellite of the plurality of satellites, wherein determined orbits of the first satellite and second satellite indicate the first satellite and second satellite will be in communication range of a target secondary ground station of the set of secondary ground stations during a target time interval;
selecting the first satellite based on comparing the first value factor and the second value factor indicating the first value factor is higher than the second value factor; and
scheduling the selected first satellite to transmit to the target secondary ground station during the target time interval.

11. The computerized method of claim 10, wherein the first value factor and the second value factor are based on at least one of the following: a time at which the data was collected and a location with which the data is associated.

12. The computerized method of claim 8, the method further comprising:
receiving, by the processor, from at least one secondary ground station of the subset of secondary ground stations, an acknowledgement of data received by the at least one secondary ground station from the satellite; and
providing, by the processor, the acknowledgement to the satellite via the primary ground station based on the satellite entering a communication range of the primary ground station.

13. The computerized method of claim 12, the method further comprising:
generating, by the processor, an updated transmission schedule associated with the satellite and the subset of secondary ground stations, wherein generating the updated transmission schedule includes generating instructions to instruct the satellite to transmit data for which no acknowledgement has been received.

14. The computerized method of claim 8, wherein estimating the expected rate of data transmission is based on at least one of the following: a distance between the satellite and the secondary ground station, weather conditions between the satellite and the secondary ground station, and hardware-based signal loss of the satellite and the secondary ground station.

15. One or more non-transitory computer storage media having computer-executable instructions for transmitting data from a satellite using a primary ground station and a set of secondary ground stations that, upon execution by a processor, cause the processor to at least:
determine an orbit of the satellite over a schedule period based on trajectory data of the satellite;
identify a subset of secondary ground stations from the set of secondary ground stations based on the determined orbit of the satellite, wherein secondary ground stations are configured to receive from the satellite and not transmit to the satellite, wherein the identified subset of secondary ground stations are within communication range of the determined orbit of the satellite;
generate a transmission schedule associated with the satellite and the subset of secondary ground stations, the generating including, for each secondary ground station of the subset of secondary ground stations:
determining a time interval during which the satellite is within communication range of the secondary ground station;
estimating an expected rate of data transmission from the satellite to the secondary ground station during the determined time interval; and
including the time interval and the expected rate of data transmission in the transmission schedule in association with the secondary ground station; and
provide the generated transmission schedule to the satellite via the primary ground station, wherein the primary ground station is configured to receive from the satellite and transmit to the satellite, whereby the satellite is configured to transmit data to the subset of secondary ground stations based on the generated transmission schedule.

16. The non-transitory computer storage media of claim 15, wherein the satellite is one of a plurality of satellites configured to transmit data to the set of secondary ground stations;
wherein generating the transmission schedule associated with the satellite includes generating a transmission schedule that schedules data transmissions from each satellite of the plurality of satellites to the set of secondary ground stations; and
wherein generating the transmission schedule that schedules data transmissions from each satellite of the plurality of satellites includes, for each secondary ground station of the set of secondary ground stations, preventing multiple satellites of the plurality of satellites from simultaneously transmitting data to the secondary ground station.

17. The non-transitory computer storage media of claim 16, wherein generating the transmission schedule that schedules data transmissions from each satellite of the plurality of satellites further includes:
comparing a first value factor of data on a first satellite of the plurality of satellites and a second value factor of data on a second satellite of the plurality of satellites, wherein determined orbits of the first satellite and second satellite indicate the first satellite and second satellite will be in communication range of a target secondary ground station of the set of secondary ground stations during a target time interval;
selecting the first satellite based on comparing the first value factor and the second value factor indicating the first value factor is higher than the second value factor; and
scheduling the selected first satellite to transmit to the target secondary ground station during the target time interval.

18. The non-transitory computer storage media of claim 17, wherein the first value factor and the second value factor are based on at least one of the following: a time at which the data was collected and a location with which the data is associated.

19. The non-transitory computer storage media of claim 15, wherein the computer-executable instructions, upon execution by a processor, further cause the processor to at least:
receive from at least one secondary ground station of the subset of secondary ground stations, an acknowledgement of data received by the at least one secondary ground station from the satellite; and provide the acknowledgement to the satellite via the primary ground station based on the satellite entering a communication range of the primary ground station.

20. The non-transitory computer storage media of claim 19, wherein the computer-executable instructions, upon execution by a processor, further cause the processor to at least:

generate an updated transmission schedule associated with the satellite and the subset of secondary ground stations, wherein generating the updated transmission schedule includes generating instructions to instruct the satellite to transmit data for which no acknowledgement has been received.

* * * * *